US011686152B2

(12) United States Patent
Graham et al.

(10) Patent No.: US 11,686,152 B2
(45) Date of Patent: *Jun. 27, 2023

(54) MANUAL WINDOW TREATMENT HAVING A FLOATING CHAIN TENSIONER

(71) Applicant: Lutron Technology Company LLC, Coopersburg, PA (US)

(72) Inventors: Evan T. Graham, Doylestown, PA (US); David A. Kirby, Zionsville, PA (US); Robert T. Nachtrieb, Kew Gardens, NY (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,638

(22) Filed: Dec. 22, 2021

(65) Prior Publication Data

US 2022/0235609 A1   Jul. 28, 2022

Related U.S. Application Data

(63) Continuation of application No. 16/521,474, filed on Jul. 24, 2019, now Pat. No. 11,236,547.

(60) Provisional application No. 62/702,536, filed on Jul. 24, 2018.

(51) Int. Cl.
*E06B 9/78* (2006.01)
*E06B 9/74* (2006.01)
*E06B 9/42* (2006.01)

(52) U.S. Cl.
CPC .................. *E06B 9/78* (2013.01); *E06B 9/42* (2013.01); *E06B 9/74* (2013.01)

(58) Field of Classification Search
CPC ................. E06B 9/42; E06B 9/78; E06B 9/74
See application file for complete search history.

(56) References Cited

U.S. PATENT DOCUMENTS

| 92,812 A | 7/1869 | Foard |
| 3,022,819 A | 2/1962 | Lampret |
| 4,662,862 A | 5/1987 | Matson |
| 4,798,562 A | 1/1989 | Matson et al. |

(Continued)

FOREIGN PATENT DOCUMENTS

| KR | 100846168 B1 | 7/2008 |
| WO | 2017219071 A1 | 12/2017 |

OTHER PUBLICATIONS

International Preliminary Report on Patentability and Written Opinion, in corresponding International Patent Application No. PCT/US2019/043313 dated Feb. 4, 2021.

(Continued)

*Primary Examiner* — Beth A Stephan
(74) *Attorney, Agent, or Firm* — Duane Morris LLP (57) ABSTRACT

A manual drive assembly for a manually-operated window treatment based on a drive chain formed as a loop, may incorporate one or more intermediate tensioners disposed between two ends of the loop. The loop may be formed between a manual clutch mechanism coupled to the window treatment and an end tensioner. The one or more intermediate tensioners may serve to limit slack in the loop such that sides of the loop cannot be pulled to create a large loop, for example, having a gap of four inches or greater, between the hanging sides of the cord.

18 Claims, 8 Drawing Sheets

(56) References Cited

U.S. PATENT DOCUMENTS

| | | |
|---|---|---|
| 4,850,934 A | 7/1989 | Gibson, Jr. et al. |
| 4,865,109 A | 9/1989 | Sherman |
| 5,671,793 A | 9/1997 | Lee |
| 5,752,558 A | 5/1998 | Lin |
| 5,797,441 A | 8/1998 | Benthin |
| 5,845,696 A | 12/1998 | Chou |
| 6,083,132 A | 7/2000 | Walker |
| 6,179,740 B1 | 1/2001 | Walker |
| 6,196,293 B1 | 3/2001 | Lee |
| 6,488,602 B1 | 12/2002 | Ebert |
| 6,743,131 B1 | 6/2004 | Walker |
| 7,479,077 B2 | 1/2009 | Markley et al. |
| 8,286,686 B2 | 10/2012 | Cannaverde |
| 8,539,645 B2 | 9/2013 | Marocco |
| 9,038,696 B2 | 5/2015 | Lava et al. |
| 9,359,815 B2 | 6/2016 | Nicolosi |
| 9,670,995 B2 | 6/2017 | Ebert et al. |
| 10,208,535 B2 | 2/2019 | Marocco |
| 10,655,385 B2 | 5/2020 | McNeill et al. |
| 11,236,547 B2 * | 2/2022 | Graham .................. E06B 9/326 |
| 2008/0121353 A1 | 5/2008 | Detmer et al. |
| 2009/0149286 A1 | 6/2009 | Walker |
| 2010/0219306 A1 | 9/2010 | Detmer et al. |
| 2011/0036517 A1 | 2/2011 | Chen |
| 2011/0185540 A1 | 8/2011 | Nevins |
| 2012/0090795 A1 | 4/2012 | Kirby |
| 2012/0152644 A1 | 6/2012 | Kydd |
| 2016/0130874 A1 | 5/2016 | Pham et al. |
| 2017/0095103 A1 | 4/2017 | Pham et al. |
| 2018/0171705 A1 | 6/2018 | Marocco |
| 2019/0186198 A1 | 6/2019 | Kirby |
| 2019/0264503 A1 | 8/2019 | Marocco |
| 2019/0390514 A1 | 12/2019 | Marocco |

OTHER PUBLICATIONS

Ebert Kettenspanntechnik GMBH, Roll-Ring Timing Belt Tensioner Brochure, Sep. 2012, 6 pages.

Office Action issued for corresponding Canadian Patent Application No. 3,106,317 dated Apr. 21, 2022, 4 pages.

* cited by examiner

MANUAL WINDOW TREATMENT HAVING A FLOATING CHAIN TENSIONER

CROSS-REFERENCE TO RELATED APPLICATIONS

This application is a continuation of U.S. patent application Ser. No. 16/521,474, filed Jul. 24, 2019, which claims the benefit of U.S. Provisional Patent Application No. 62/702,536, filed Jul. 24, 2018, the entire disclosures of which are hereby incorporated by reference.

BACKGROUND

A window treatment may be mounted in front of one or more windows, for example, to prevent sunlight from entering a space and/or to provide privacy. Window treatments may include, for example, but are not limited to, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows that the roller shade is mounted in front of.

A typical window treatment may be manually-operated or motor-operated. In the case of a manually-operated window treatment, the rotation of the roller tube may be provided by an input wheel that receives an input chain. The input wheel converts a pulling force applied to the input chain into a rotational force. A typical input chain may be a ball or beaded chain loop. A non-limiting example of a manual roller shade having a beaded chain is described in greater detail in U.S. Patent Application Publication No. 2008/0121353, published May 29, 2008, entitled MANUAL ROLLER SHADE HAVING CLUTCH MECHANISM, CHAIN GUIDE AND UNIVERSAL MOUNTING, the entire disclosure of which is hereby incorporated by reference. A holding device may be installed at the bottom of the ball chain loop such that the input chain may be tensioned and may not be free hanging. This holding device may be provided because it may be desirable that the input chain cannot be pulled to create a large loop, for example, having a gap of four inches or greater, between the hanging sides of the cord.

One example of a manual roller shade that has a beaded chain that is not formed in a loop is described in U.S. Patent Application Publication No. 2012/0090795, published Apr. 19, 2012, entitled MANUAL ROLLER SHADE SYSTEM, the entire disclosure of which is hereby incorporated by reference. However, there is still a desire to have a manual shade with a beaded chain that is exposed and can be grabbed by the user to move the shade fabric, while still maintaining a relatively small loop when the chain is pulled (e.g., less than four inches).

SUMMARY OF THE DISCLOSURE

A drive assembly for use with a manually-operated window treatment, according to aspects of the present disclosure, may include a drive chain, e.g., but not limited to, a ball chain, arranged in the form of a loop between a manual clutch mechanism coupled to the window treatment and an end tensioner. The drive assembly may include one or more intermediate tensioners disposed on the drive-chain loop between the manual clutch mechanism and the end tensioner. The one or more intermediate tensioners may provide a mechanism by which to prevent slack in the loop, for example, such that sides of the loop cannot be pulled to create a large loop, for example, having a gap of four inches or greater, between the hanging sides of the cord.

Various aspects of the present disclosure may be directed to various types of mechanisms for the one or more intermediate tensioners. According to such aspects of the present disclosure, an intermediate tensioner may include at least one sprocket, which may engage both sides of the drive chain loop, and may be contained within a housing.

DETAILED DESCRIPTION OF ASPECTS OF THE DISCLOSURE

Figure 1:
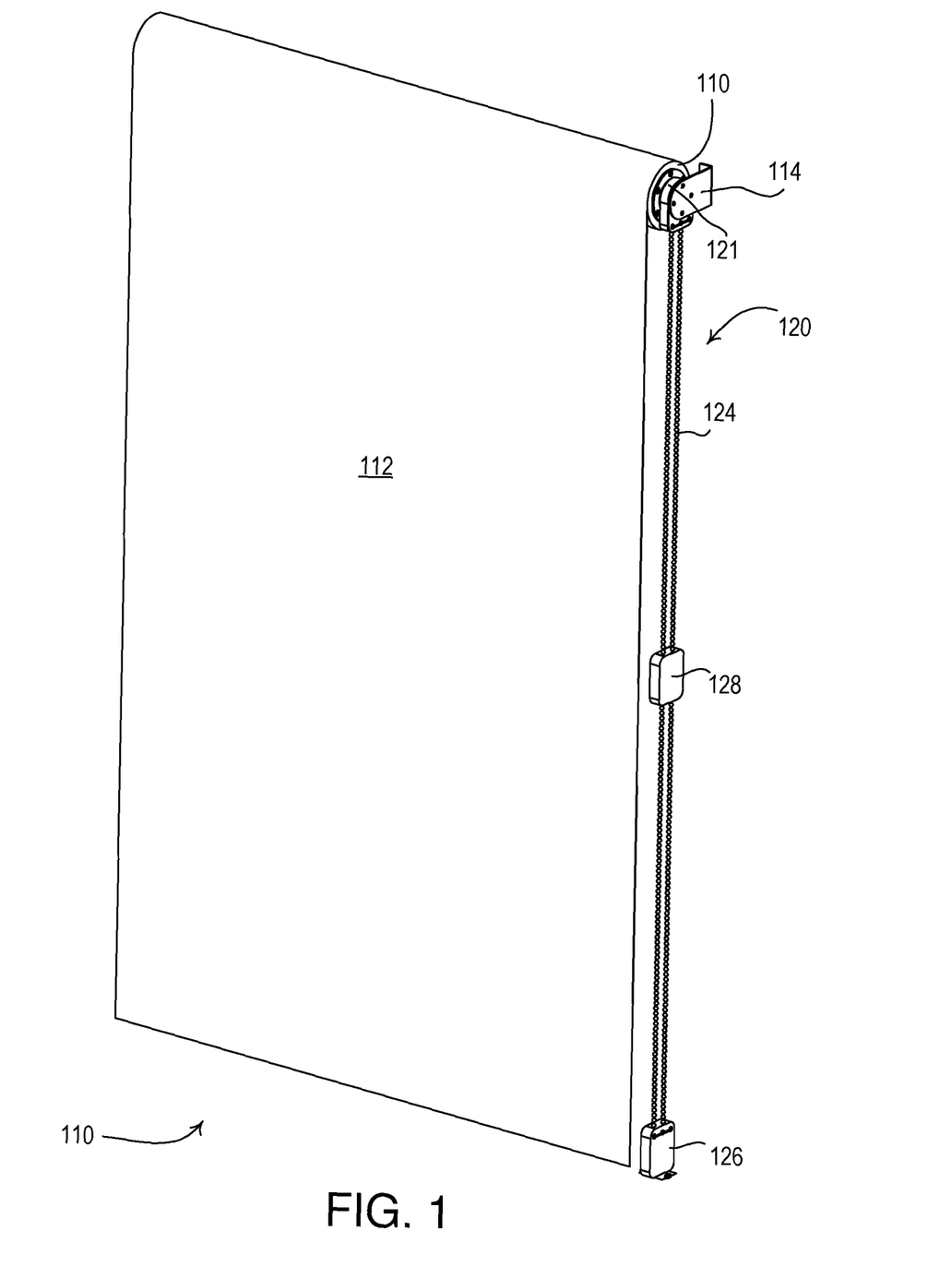
FIG. 1 shows a perspective view of an example of a window treatment system.
Figure 2:
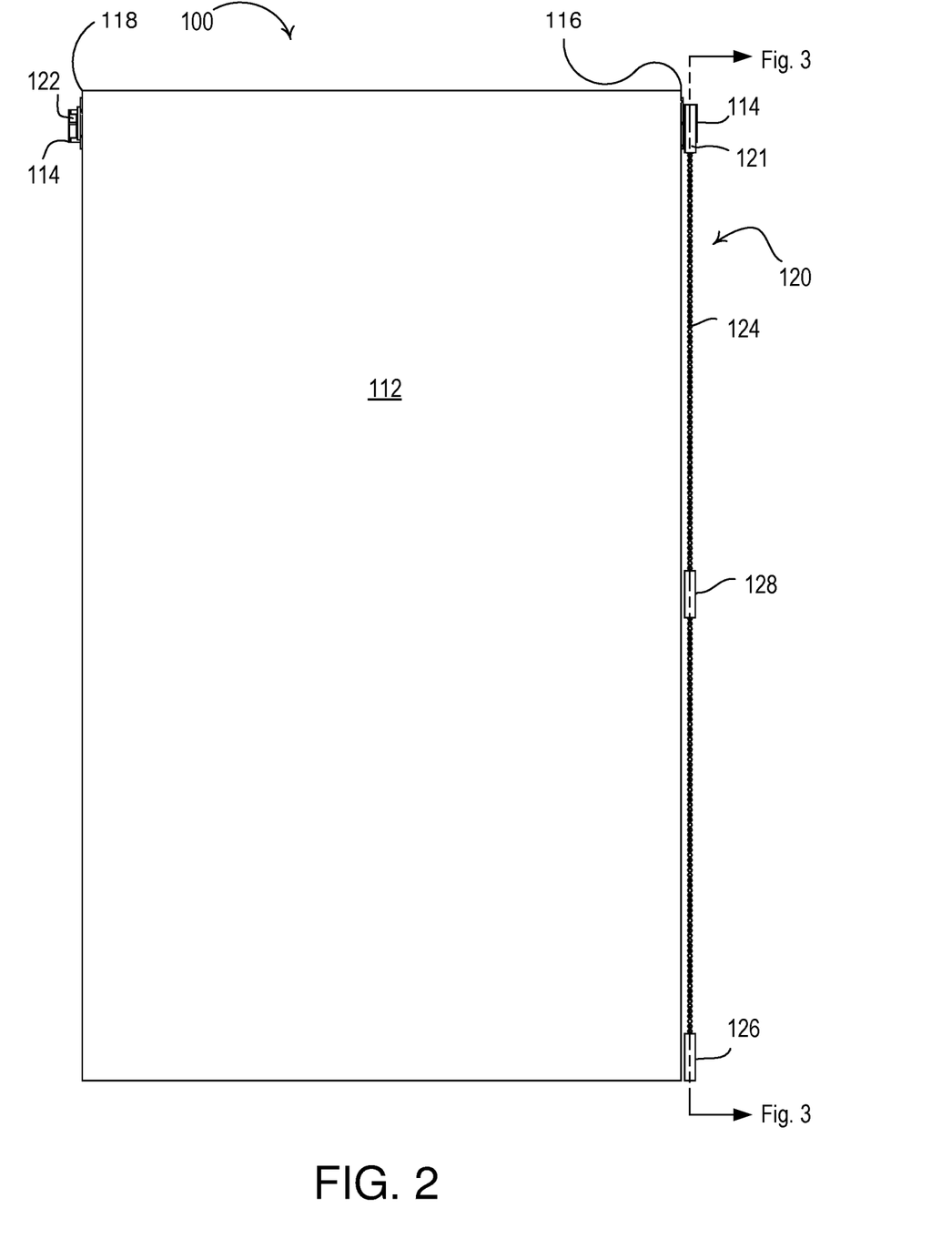
FIG. 2 shows a front view of the window treatment system of FIG. 1.

FIG. 1 is a perspective view and FIG. 2 is a front view of an example manual window treatment 100 (e.g., a manually-operated roller shade). The example window treatment 100 may include a roller tube 110, a covering material 112 (e.g., a flexible shade fabric), and one or more brackets 114. The covering material 112 may be windingly received by the roller tube 110. The roller tube 110 may be elongated from a first end 116 to a second end 118 (FIG. 2). The brackets 114 may be located at opposite ends of the manual roller shade 100 for supporting the manual window treatment 100 from a fixed support surface such as a wall or ceiling of a structure, for example.

The manual window treatment 100 may comprise a drive assembly 120 (e.g., a drive mechanism), which may include a manual clutch mechanism 121 that may be located at the first end 116 of the roller tube 110. The manual clutch mechanism 121 may be bi-directional to provide for raising and lowering of the covering material 112 (e.g., between a fully-open position and a fully-closed position). The manual clutch mechanism 121 may be configured to rotatably drive the roller tube 110. The manual clutch mechanism 121 may be configured to prevent back-driving of the roller tube 110 that could otherwise occur, for example, if a pulling force was applied to a lower end of the covering material 112 supported by the roller tube 110. The manual window treatment 100 may include an idler assembly 122 (FIG. 2) that may be located adjacent to the second end 118 of the roller tube 110 opposite the manual clutch mechanism 121. The idler assembly 122 may provide rotatable support for the roller tube 110 at the second end 118 of the roller tube 110.

The drive assembly of the manual window treatment 100 may also comprise a drive chain 124 (e.g., a beaded or ball chain). The drive chain 124 may be received by the manual clutch mechanism 121 in the roller tube 100, such that oppositely-located (e.g., front and rear) portions of the drive chain 124 hangs from the manual clutch mechanism 121. For example, the drive chain 124 may be anchored by an end tensioner 126 (e.g., an end chain tensioner), which may be attached to a structure (e.g., a wall, a window sill, and/or a surface adjacent to the window) near the bottom end of the shade fabric. The drive chain 124 may form a loop, e.g., a continuous loop. The loop of the drive chain 124 may have a first end at the manual clutch mechanism 121 and a second end at the end tensioner 126. The loop of the drive chain 124 may comprise two sides defined between the first and second ends of the loop (e.g., adjacent front and rear portions of the drive chain 124). The manual clutch mechanism 121 maybe configured to rotate the roller tube 110 in response to movements of the drive chain 124. For example, the drive chain 124 may be configured to provide for a sufficient number of rotations of the roller tube 110 for raising or lowering the covering material 112 (e.g., from the fully-closed position to the fully-open position or vice versa) when a pulling force is applied to a section of the front or rear portion of the drive chain 124.

The drive assembly of the manual window treatment 100 may also comprise an intermediate tensioner 128 (e.g., a floating chain tensioner) disposed between the manual clutch mechanism 121 and the end tensioner 126. The intermediate tensioner 128 may be configured to float between the manual clutch mechanism 121 and the end tensioner 126, for example, around a midpoint of the drive chain 124 between the manual clutch mechanism 121 and the end tensioner 126. The intermediate tensioner 128 may be configured to prevent the drive chain 124 from being pulled to form too large of a loop as will be described in greater detail below with reference to FIG. 3.

Figure 3:
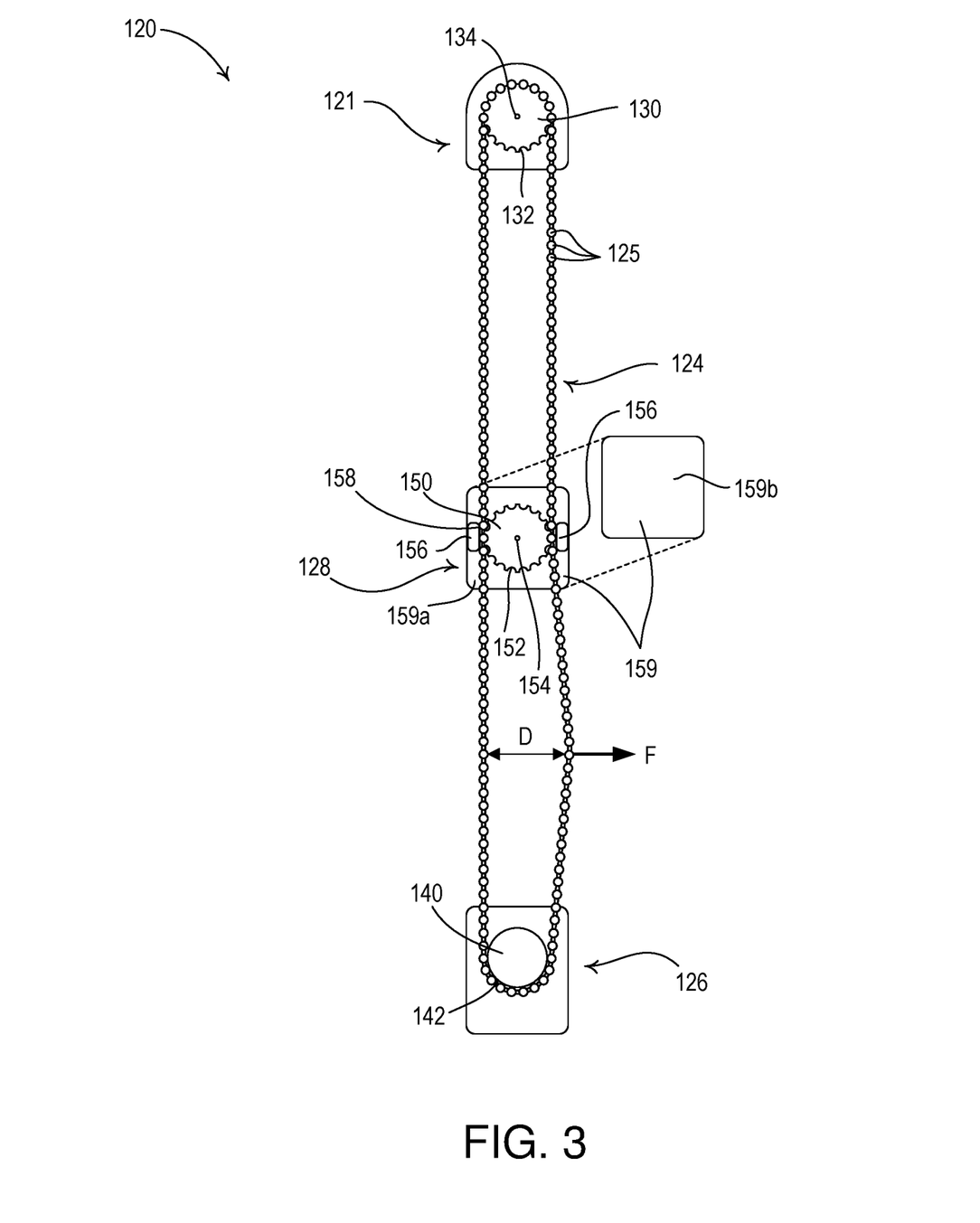
FIG. 3 shows a side cross-sectional view of an example of a drive assembly of a window treatment system.

FIG. 3 is a simplified left-side cross-sectional view of an example of the manual window treatment 100 taken through the line shown in FIG. 2 (e.g., through the center of the drive chain 124). Note that in FIG. 3, the drive chain 124 is shown enlarged and having a shorter length for illustrative purposes. The manual clutch mechanism 121 may comprise a drive sprocket 130 having bead notches 132 in which beads 125 of the drive chain 124 may be received, such that movements of the drive chain rotate the drive sprocket. The drive sprocket 130 may comprise a drive pin 134 coupled to the roller shade 110 to provide for rotation of the roller tube in response to movements of the drive chain 124. The mechanical construction of an example drive assembly is described in greater detail in previously-referenced U.S. Patent Application Publication No. 2008/0121353. The end tensioner 126 may provide a stationary, curved surface 142, which may, for example, be formed as an outer circumference of a circular or partially circular (e.g., at least semi-circular) member 140.

The intermediate tensioner 128 may comprise an inner sprocket 150 having bead notches 152 for receiving the beads 125 of adjacent front and rear portions of the drive chain 124. The inner sprocket 150 may rotate around an inner pin 154 as the drive chain 124 is moved. The intermediate tensioner 128 may also comprise clamps 156 disposed along and/or in parallel with vertical sides of the intermediate tensioner 128, on both sides of inner sprocket 150, in order to hold the adjacent front and rear portions of the drive chain 124 against the inner sprocket 150. The clamps 156 may comprise inner surfaces 158 along which the beads 125 of the drive chain 124 may slide as the beads are received in the bead notches 152 of the inner sprocket 150 while the inner sprocket rotates. The inner sprocket 150 and the clamps 156 may be housed in a housing 159 of the intermediate tensioner 128. The inner pin 154 around which the inner sprocket 150 rotates may be connected to the housing 159 and/or an arm or other structure (not shown) that may extend between the clamps 156.

The housing 159 may be of a two-piece design, a non-limiting example of which is shown in FIG. 3. The housing 159 may have first and second pieces 159a and 159b. The inner sprocket 150, the clamps 156, the inner pin 154, and/or other parts that may be discussed below may be disposed within the housing 159, and one or both of the first and second pieces 159a, 159b of housing 159 may have holes, slots, grommets, etc., that may permit the two sides of the loop of drive chain 124 (e.g., the adjacent front and rear portions of the drive chain 124) to pass through the intermediate tensioner 128 and engage with the mechanism(s) within the housing 159. The first and second pieces 159a, 159b may be attached to one another by means of, for example, but not limited to, a snap-fit mechanism, glue, one or more screws, etc., or combinations thereof.

The intermediate tensioner 128 may operate to limit the drive chain 124 to forming a loop characterized by a distance D between front and rear portions of the drive chain 124 when one side of the drive chain is pulled with a force F (e.g., from forming a loop bigger than a loop characterized by than the distance D between front and rear portions of the drive chain 124). For example, when the drive chain 124 has a length of approximately seven feet between the manual clutch mechanism 121 and the end tensioner 126, where the intermediate tensioner 128 is located at the midpoint of the drive chain 124 between the manual clutch mechanism 121 and the end tensioner 126, the intermediate tensioner 128 may limit the drive chain 124 to forming a loop characterized by a distance of 3.25 inches between front and rear portions of the drive chain 124 when one side of the drive chain is pulled with a force of 5 pounds. Without the intermediate tensioner 128 installed, the drive chain 124 may form a loop characterized by a distance of 4.5 inches when one side of the drive chain is pulled with a force of 5 pounds.

Figure 4:
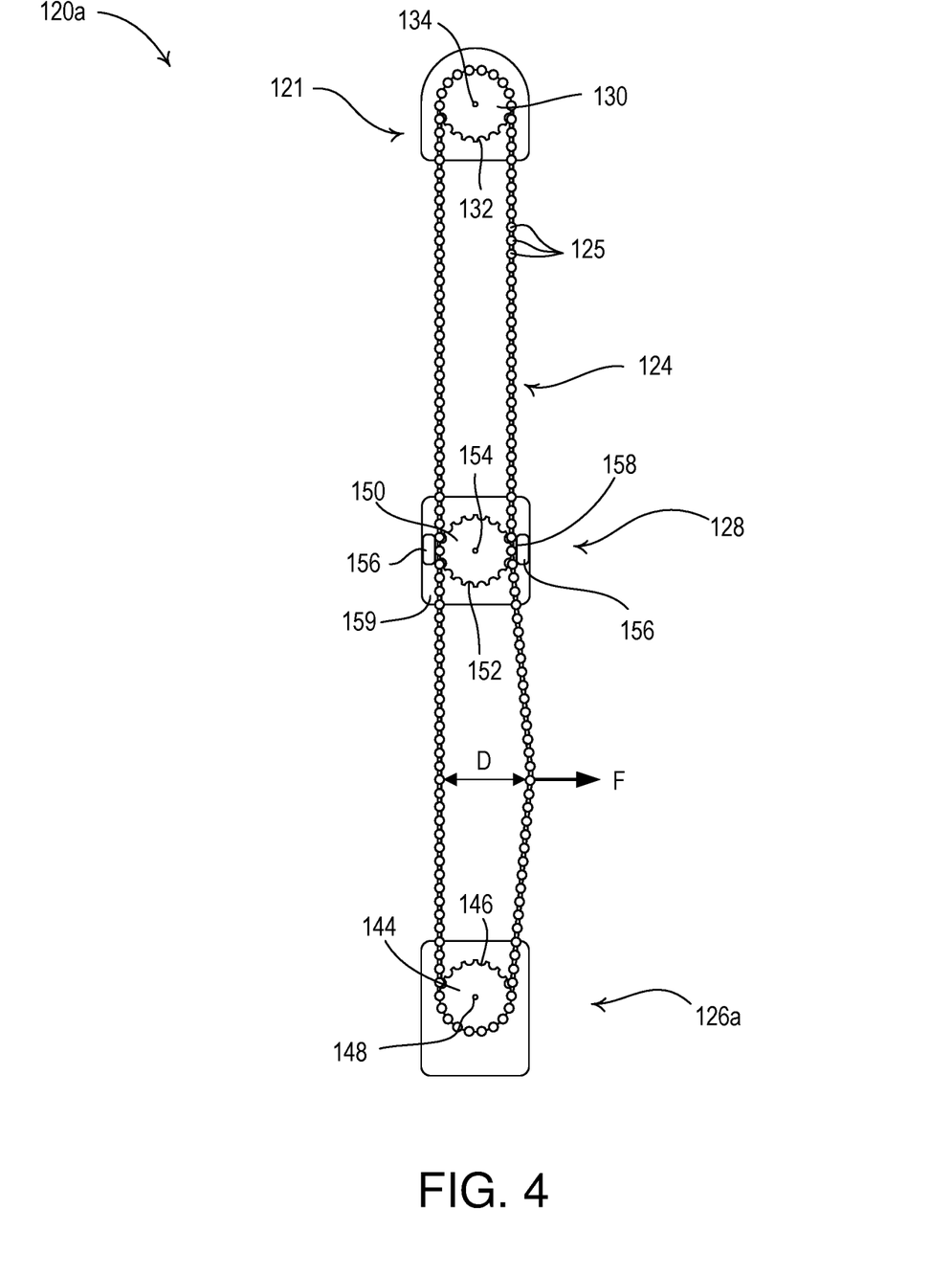
FIGS. 4-6A show side cross-sectional views of other examples of drive assemblies of a window treatment system.

FIG. 4 is a simplified left-side cross-sectional view of an example of a drive assembly 120a of a manual window treatment (e.g., the manual window treatment 100) taken along the line shown in FIG. 2. The drive assembly 120a shown in FIG. 4 is similar to the drive assembly 120 of the manual window treatment 100 shown in FIG. 3, except for the structure of the end tensioner 126. The drive assembly 120a shown in FIG. 4 may comprise an end tensioner 126a (e.g., which may replace the end tensioner 126 of the drive assembly 120 of the manual window treatment 100 shown in FIG. 3). The sprocket 144 of the end tensioner 126a may comprise a sprocket 144 that may have bead notches 146 for receiving the beads 125 of the drive chain 124 and may rotate around a pin 148 as the drive chain 124 is moved.

Figure 5:
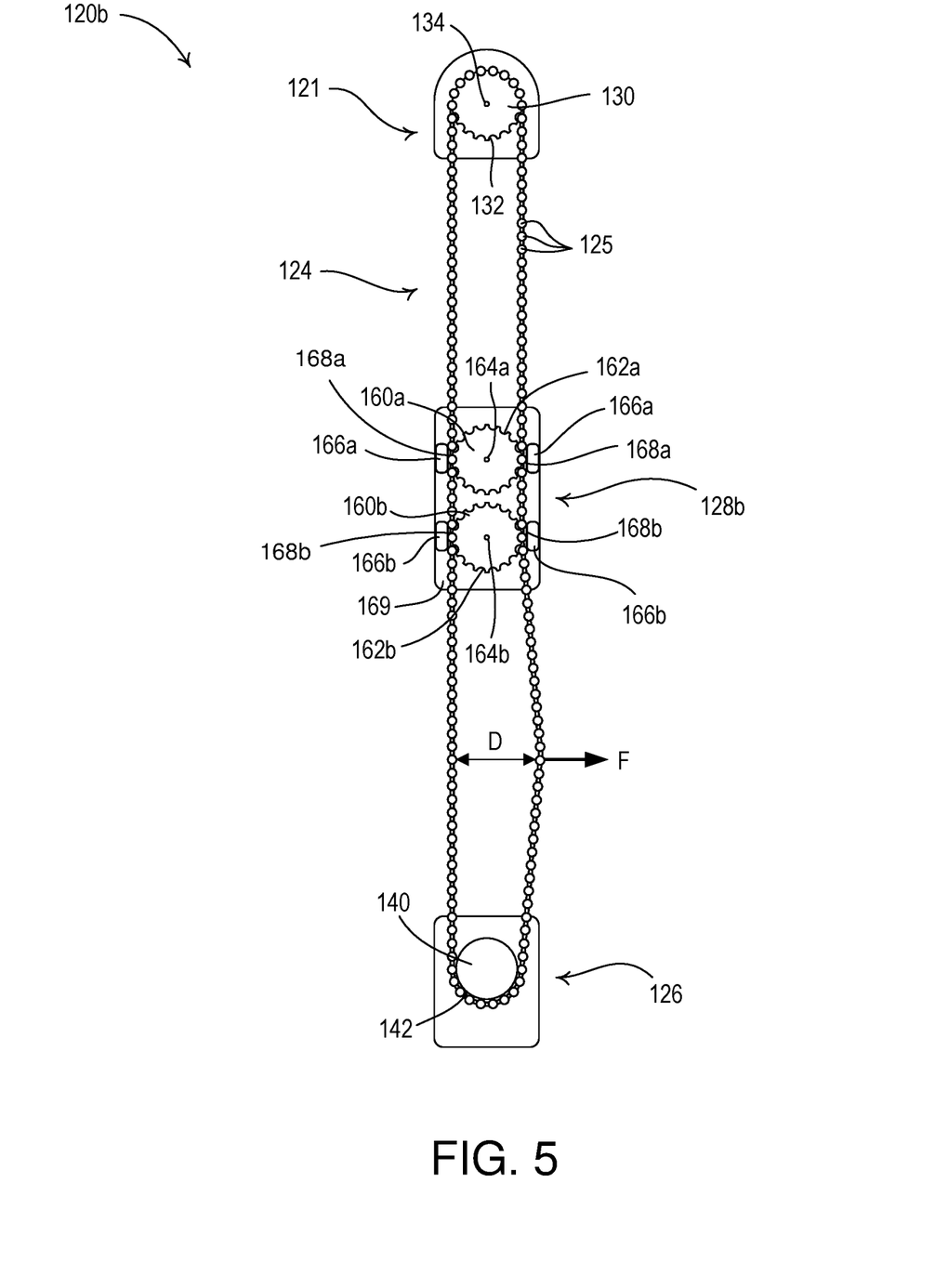

FIG. 5 is a simplified left-side cross-sectional view of another example of a drive assembly 120b of a manual window treatment (e.g., the manual window treatment 100) taken along the line shown in FIG. 2. The drive assembly 120b shown in FIG. 5 is similar to the drive assembly 120 of the manual window treatment 100 shown in FIG. 3, except for the form of the intermediate tensioner 128. The drive assembly 120b shown in FIG. 5 may comprise an intermediate tensioner 128b (e.g., which may replace the intermediate tensioner 128 of the drive assembly 120 of the manual window treatment 100 shown in FIG. 3). The intermediate tensioner 128b may contain multiple inner sprockets 160a, 160b. For example, the intermediate tensioner 128b may comprise two inner sprockets 160a, 160b as shown in FIG. 5, but may also comprise more than two such inner sprockets. The inner sprockets 160a, 106b may have respective bead sockets 162a, 162b for receiving the beads 125 of the adjacent front and rear portions of the drive chain 124. The inner sprockets 160*a*, 160*b* may rotate about respective inner pins 164*a*, 164*b* as the drive chain 124 is moved.

Figure 5A:
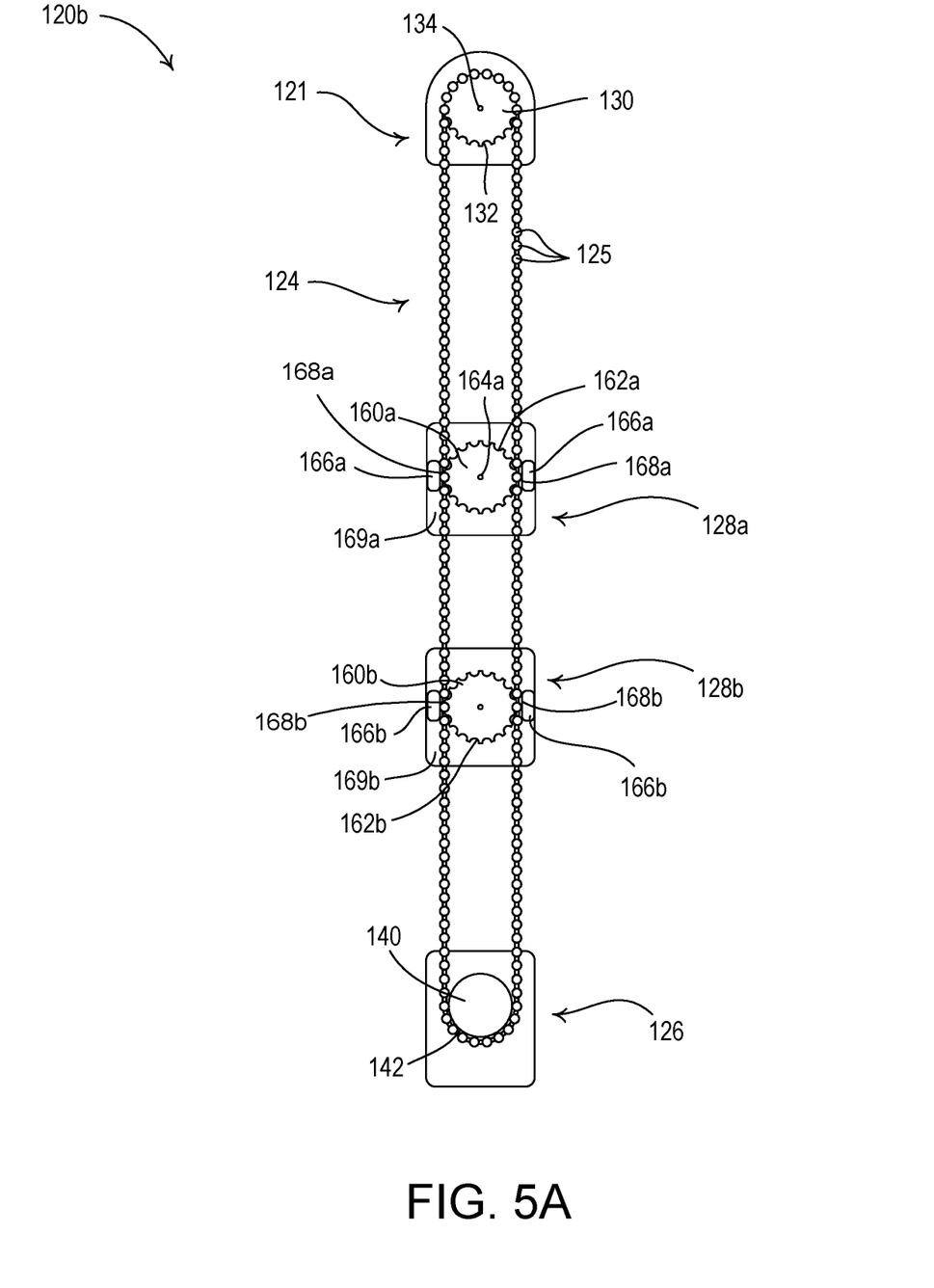

Pairs of clamps 166*a*, 166*b* may be provided (e.g., similar to clamps 156) on both sides of respective inner sprockets 160*a*, 160*b*. The clamps 166*a*, 166*b* may comprise respective inner surfaces 168*a*, 168*b*, along which the beads 125 of the drive chain 124 may slide as the beads are received in the bead sockets 162*a*, 162*b* of the inner sprockets 160*a*, 160*b* while the inner sprockets 160*a*, 160*b* rotate. The inner sprockets 160*a*, 160*b* may be housed in a housing 169, and the inner pins 164*a*, 164*b* about which the inner sprockets 160*a*, 160*b* rotate may be connected to the housing 169 and/or to arms or other structures that may extend between the pairs of clamps 166*a*, 166*b*. In addition, the multiple inner sprockets 160*a*, 160*b*, along with their inner pins 164*a*, 164*b* and pairs of clamps 166*a*, 166*b* may be separated and housed in separate housings 169*a*, 169*b* disposed along the drive chain 124 as illustrated in FIG. 5A, which shows intermediate tensioners 128*a*, 128*b* disposed along drive chain 124.

Figure 6:
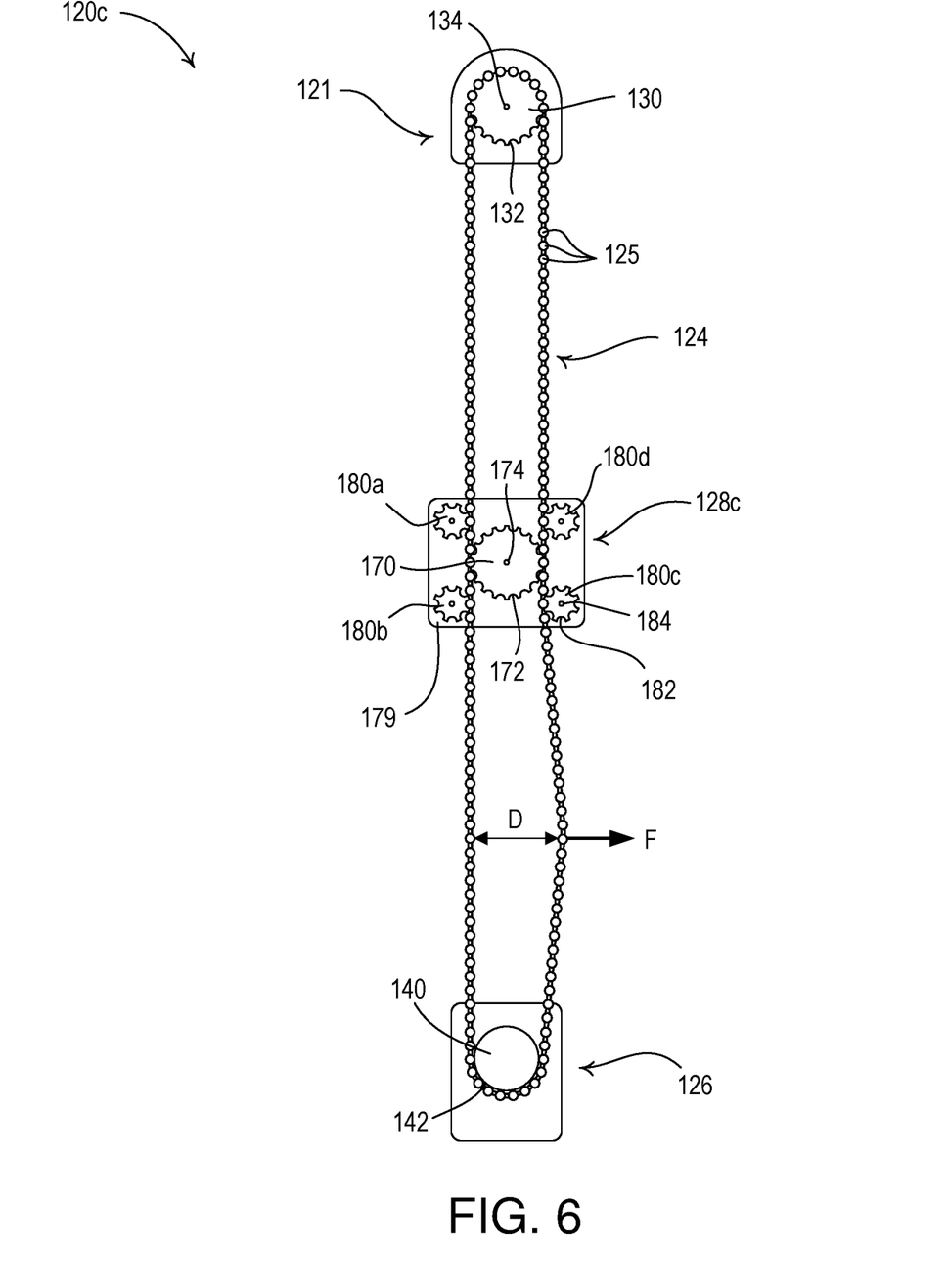

FIG. 6 is a simplified left-side cross-sectional view of another example of a drive assembly 120*c* of a manual window treatment (e.g., the manual window treatment 100) taken along the line shown in FIG. 2. The drive assembly 120*c* shown in FIG. 6 is similar to the drive assembly 120 of the manual window treatment 100 shown in FIG. 3 except for the form of the intermediate tensioner 128. The drive assembly 120*c* shown in FIG. 6 may comprise an intermediate tensioner 128*c* (e.g., which may replace the intermediate tensioner 128 of the drive assembly 120 of the manual window treatment 100 shown in FIG. 3). The intermediate tensioner 128*c* of FIG. 6 may comprise an inner sprocket 170, having bead sockets 172 for receiving the beads 125 of the drive chain 124. The inner sprocket 170 may rotate about a pin 174. In contrast to the previous examples, the intermediate tensioner 128*c* may not include clamps, but instead may include outer sprockets 180*a*, 180*b*, 180*c*, 180*d* (e.g., satellite sprockets). A first pair of the outer sprockets 180*a*, 180*b* may engage the front portion of the drive chain 124 and maintain engagement of the front portion of the drive chain 124 with the inner sprocket 170. A second pair of the outer sprockets 180*c*, 180*d* may engage the rear portion of the drive chain 124 and maintain engagement of the rear portion of the drive chain 124 with the inner sprocket 170.

Using the outer sprocket 180*c* as an illustrative but non-limiting example, a respective outer sprocket 180*c* may have bead sockets 182 for receiving the beads 125 of the drive chain 124, and may rotate about a pin 184. The inner socket 170 and outer sprockets 180*a*, 180*b*, 180*c*, 180*d* may be contained within a housing 179. The inner pin 174 about which the inner sprocket 170 rotates may be connected to the housing 179 and/or to arms, a support frame, or other structures that may contained within housing 179 or be attached to or part of housing 179. Similarly, the pins 184 about which the outer sprockets 180*a*, 180*b*, 180*c*, 180*d* rotate may be similarly disposed. The pins 184 and/or the inner pin 174 may be disposed on a common structure or two or more different structures (e.g., but not limited to, a case in which the inner pin 174 is attached to the housing 179, while the pins 184 are part of or attached to a frame within or attached to the housing 179).

In the example of FIG. 6, as a force is applied to the drive chain 124, the drive chain 124 may be guided along and around the sprocket 130 of the manual clutch mechanism 121 and along and around the curved surface 142 of the end tensioner 126 or the sprocket 144 of the end tensioner 126. As part of this, the beads 125 of the drive chain 124 maybe guided into and out of the intermediate tensioner 128*c*. Within the intermediate tensioner 128*c*, the beads 125 of the drive chain 124 may engage with the inner sprocket 170 and the outer sprockets 180*a*, 180*b*, 180*c*, 180*d* of intermediate tensioner 128*c*. As such, the outer sprockets 180*a*, 180*b*, 180*c*, 180*d* may serve to guide the drive chain 124 such that the beads 125 are maintained in engagement with the inner sprocket 170 as the drive chain 124 is in motion.

Figure 6A:
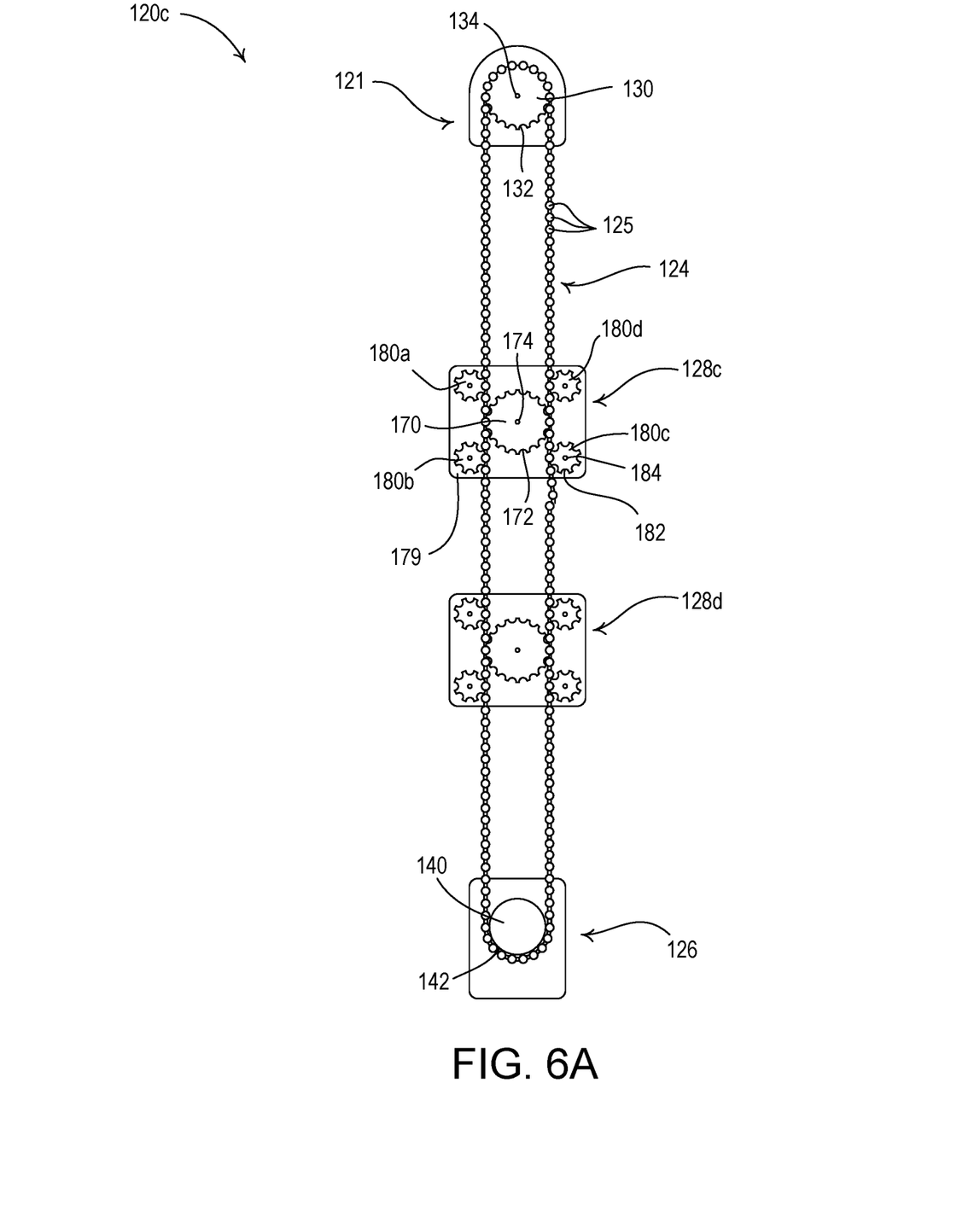

It is further contemplated that the housing 179 may contain more than one inner sprocket 170 and more than one set of outer sprockets 180*a*, 180*b*, 180*c*, 180*d*. Furthermore, it is also contemplated that more than one intermediate tensioner, e.g., intermediate tensioners 128*c*, 128*d*, may be provided along drive chain 124 as illustrated in FIG. 6A. It is yet further contemplated that combinations of the features found in the intermediate tensioners 128, 128*b*, 128*c* may be used in a single chain drive assembly and that the variations of the end tensioner 126, 126*a* of FIGS. 3 and 4 may be used in combination with any intermediate tensioner 128, 128*b*, 128*c* or combinations and variations thereof.

According to a further aspect of the present disclosure, one or more components may be attached to a stationary structure, such as, but not limited to, a wall, window frame, or window sill. In particular, intermediate tensioners 128, 128*b*, 128*c* and/or end tensioners 126, 126*a* may be fixed to one or more such stationary structures, using, for example, but not limited to, glue, nails, screws, tape, staples, tacks, brackets, etc.

According to some aspects of the present disclosure, the drive chain 124 may not limited to being a ball chain. In one further example, the drive chain may contain links (not shown), rather than beads 125. In this example, an intermediate tensioner may comprise a sprocket (not shown) having pins designed to engage the links of the drive chain as the drive chain is drawn through the window treatment drive assembly.

Finally, it is contemplated that, while the drive assemblies 120, 120*a*, 120*b*, 120*c* described above are described in the context of a roller shade, the drive assemblies may also be used with other types of manual window treatments, such as, but not limited to, cellular shades, draperies, Roman shades, venetian blinds, vertical blinds (e.g., the rotation that rolls the roller shade up or down may be translated into horizontal forces, e.g., using an appropriate transmission mechanism, as may be known in the art, to open and close vertical blinds, draperies, or the like), etc.

What is claimed is:

1. A drive assembly configured for use with a window treatment, the drive assembly including:
   a drive chain comprising a beaded chain having a plurality of beads and configured as a loop having first and second ends;
   a clutch mechanism configured to be coupled to the window treatment, the clutch mechanism coupled to the drive chain at the first end of the loop such that the clutch mechanism rotates when a force is applied to the drive chain to operate the window treatment; and
   an intermediate tensioner coupled to the drive chain at two sides of the loop between the first and second ends of the loop, the intermediate tensioner comprising:
   a sprocket having notches configured to receive the beads of the drive chain, the sprocket configured to engage the two sides of the loop and to rotate when the force is applied to the drive chain; and
   first and second clamps disposed along respective sides of the sprocket and configured to maintain engagement of the sprocket with the drive chain at the two sides of the loop, the first and second clamps comprising respective inner surfaces along which the beads of the drive chain pass as the beads are received in the notches of the sprocket while the sprocket rotates, wherein the intermediate tensioner is configured to be disposed at more than one location along the loop of the drive chain.

2. The drive assembly of claim 1, wherein the intermediate tensioner comprises a housing in which the sprocket and first and second clamps are located.

3. The drive assembly of claim 2, wherein the sprocket comprises a first sprocket, and the intermediate tensioner comprises a second sprocket located within the housing and having notches configured to receive the beads of the drive chain, the second sprocket configured to engage the two sides of the loop and to rotate when the force is applied to the drive chain.

4. The drive assembly of claim 3, wherein the second sprocket comprises third and fourth clamps disposed along respective sides of the second sprocket and configured to maintain engagement of the second sprocket with the drive chain at the two sides of the loop.

5. The drive assembly of claim 4, wherein the third and fourth clamps comprise respective inner surfaces along which the beads of the drive chain pass as the beads are received in the notches of the second sprocket while the second sprocket rotates.

6. The drive assembly of claim 1, wherein the intermediate tensioner is configured to substantially maintain limited separation between the two sides of the loop of the drive chain.

7. The drive assembly of claim 6, wherein the intermediate tensioner is configured to be disposed at more than one location between the clutch mechanism and the end tensioner.

8. The drive assembly of claim 1, wherein the intermediate tensioner is configured to float between the first end and the second end of the loop of the drive chain.

9. The drive assembly of claim 1, wherein the intermediate tensioner is configured to be affixed to a stationary structure.

10. The drive assembly of claim 1, further comprising:
an end tensioner coupled to the second end of the loop;
wherein the intermediate tensioner is coupled to the drive chain at the two sides of the loop between the clutch mechanism and the end tensioner.

11. A drive assembly configured for use with a window treatment, the drive assembly including:
a drive chain comprising a beaded chain having a plurality of beads and configured as a loop having first and second ends;
a clutch mechanism configured to be coupled to the window treatment, the clutch mechanism coupled to the drive chain at the first end of the loop such that the clutch mechanism rotates when a force is applied to the drive chain to operate the window treatment; and
an intermediate tensioner coupled to the drive chain at first and second sides of the loop between the first and second ends of the loop, the intermediate tensioner comprising:
an inner sprocket having notches configured to receive the beads of the drive chain, the inner sprocket configured to configured to engage the first and second sides of the loop and to rotate when the force is applied to the drive chain;
a first pair of outer sprockets having notches configured to receive the beads of the drive chain and, the first pair of sprockets configured to engage the first side of the loop; and
a second pair of outer sprockets having notches configured to receive the beads of the drive chain, the second pair of sprockets configured to engage the second side of the loop;
wherein the first and second pairs of outer sprockets are further configured to guide the drive chain to maintain engagement of the inner sprocket with the drive chain at the first and second sides of the loop when the force is applied to the drive chain,
wherein the intermediate tensioner is configured to float between the first end of the loop of the drive chain and the second end of the loop of the drive chain.

12. The drive assembly of claim 11, wherein the intermediate tensioner comprises a housing in which the inner sprocket and the first and second pairs of outer sprockets are located.

13. The drive assembly of claim 12, wherein the inner sprocket is located at a center of the housing, the first pair of outer sprockets is located along a first side of the housing, and the second pair of outer sprockets is located along a second side of the housing.

14. The drive assembly of claim 11, wherein the intermediate tensioner is configured to substantially maintain limited separation between the first and second sides of the loop of the drive chain.

15. The drive assembly of claim 14, wherein the intermediate tensioner is configured to be disposed at more than one location between the clutch mechanism and the end tensioner.

16. The drive assembly of claim 11 wherein the intermediate tensioner is configured to be disposed at more than one location along the loop of the drive chain.

17. The drive assembly of claim 11, wherein the intermediate tensioner is configured to be affixed to a stationary structure.

18. The drive assembly of claim 11, further comprising:
an end tensioner coupled to the second end of the loop;
wherein the intermediate tensioner is coupled to the drive chain at the two sides of the loop between the clutch mechanism and the end tensioner.

* * * * *